(12) United States Patent
Silitonga

(10) Patent No.: US 11,121,664 B2
(45) Date of Patent: Sep. 14, 2021

(54) SIGNAL CONVERSION DEVICE AND MOTOR DRIVE SYSTEM

(71) Applicant: NIDEC SERVO CORPORATION, Kiryu (JP)

(72) Inventor: Charles Simson Halason Silitonga, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 4 days.

(21) Appl. No.: 16/817,682

(22) Filed: Mar. 13, 2020

(65) Prior Publication Data

US 2020/0336096 A1 Oct. 22, 2020

(30) Foreign Application Priority Data

Apr. 16, 2019 (JP) .............................. JP2019-078121

(51) Int. Cl.
| | | |
|---|---|---|
| *H02P 27/08* | (2006.01) | |
| *H02M 7/537* | (2006.01) | |
| *H02M 1/00* | (2006.01) | |

(52) U.S. Cl.
CPC ............ *H02P 27/08* (2013.01); *H02M 7/537* (2013.01); *H02M 1/0009* (2021.05)

(58) Field of Classification Search
CPC .......... H02P 27/08; H02P 27/04; H02P 27/06; H02P 1/00; H02P 1/12; H02P 1/24; H02P 1/26; H02P 1/42; H02P 3/00; H02P 3/18; H02M 2001/0009; H02M 7/537; H02M 1/00; H02M 1/042; H02M 1/081; H02M 1/4216; H02M 5/00; H02M 5/32; H02M 7/00; H02M 7/02; H02M 7/86
See application file for complete search history.

(56) References Cited

U.S. PATENT DOCUMENTS 8,942,018 B2 * 1/2015 Ho ........................ H02M 7/217
363/126

FOREIGN PATENT DOCUMENTS

JP 2010-043854 A 2/2010

\* cited by examiner

*Primary Examiner* — Antony M Paul
(74) *Attorney, Agent, or Firm* — Keating & Bennett, LLP

(57) ABSTRACT

A signal conversion device includes a first signal input terminal, a second signal input terminal, and a detector. A first AC signal is supplied to the first signal input terminal from a signal source. The second signal input terminal is supplied with an in-phase signal that is in phase with the first AC signal and an opposite-phase signal that is opposite in phase with the first AC signal. The second signal input terminal is supplied with a second AC signal whose phase has been switched by a switchover between the in-phase signal and the opposite-phase signal from the signal source. The detector detects, using the supplied first AC signal, whether the supplied second AC signal is the in-phase signal or the opposite-phase signal.

10 Claims, 6 Drawing Sheets

SIGNAL CONVERSION DEVICE AND MOTOR DRIVE SYSTEM

CROSS REFERENCE TO RELATED APPLICATION

The present application claims priority under 35 U.S.C. § 119 to Japanese Application No. 2019-078121 filed on Apr. 16, 2019 the entire contents of which are hereby incorporated herein by reference.

FIELD

The present disclosure relates to a signal conversion device and a motor drive system.

BACKGROUND

Research and development on technology related to a system (motor drive system) that controls a motor or the like to be controlled has been performed.

In this regard, there has been known a device that performs ON/OFF control on a plurality of control targets using a switch provided outside the control targets.

In the prior art, for example, when performing ON/OFF control on a plurality of control targets, the device detects part of the current flowing to a specific control target, and the device may controls other control targets based on the detection results. However, the current flowing through the control target may have various values depending on the type, power consumption, number, operating state, and the like of the control target. In such a case, it was difficult to set the reference value (threshold) for detecting the magnitude of the current flowing to the control target to an appropriate value, and it was sometimes difficult to control the control target by detecting the flow of current to the control target with high accuracy.

SUMMARY

According to a first example embodiment of the present disclosure, a signal conversion device includes a first signal input terminal, a second signal input terminal, and a detector. The first signal input terminal is supplied with a first AC signal from a signal source. The second signal input terminal includes an in-phase signal that is in phase with the first AC signal and an opposite-phase signal that is opposite in phase with the first AC signal. The second signal input terminal is supplied with a second AC signal whose phase has been switched by a switchover between the in-phase signal and the opposite-phase signal from the signal source. The detector detects, using the supplied first AC signal, whether the supplied second AC signal is the in-phase signal or the opposite-phase signal.

According to a second example embodiment of the present disclosure, a motor drive system includes a motor main body, the signal conversion device, and a drive circuit that controls the motor main body based on a detection result by the signal conversion device.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings. In the present example embodiment, a conductor for transmitting an electric signal will be described as a power supply line, a ground line, wiring, a control signal line, or the like. The power supply line and the ground line may be, for example, a cord, may be a conductor printed on the board, or may be a conductor of any shape such as a bus bar. "Connect" in the example embodiment includes electrically connecting.

Figure 1:
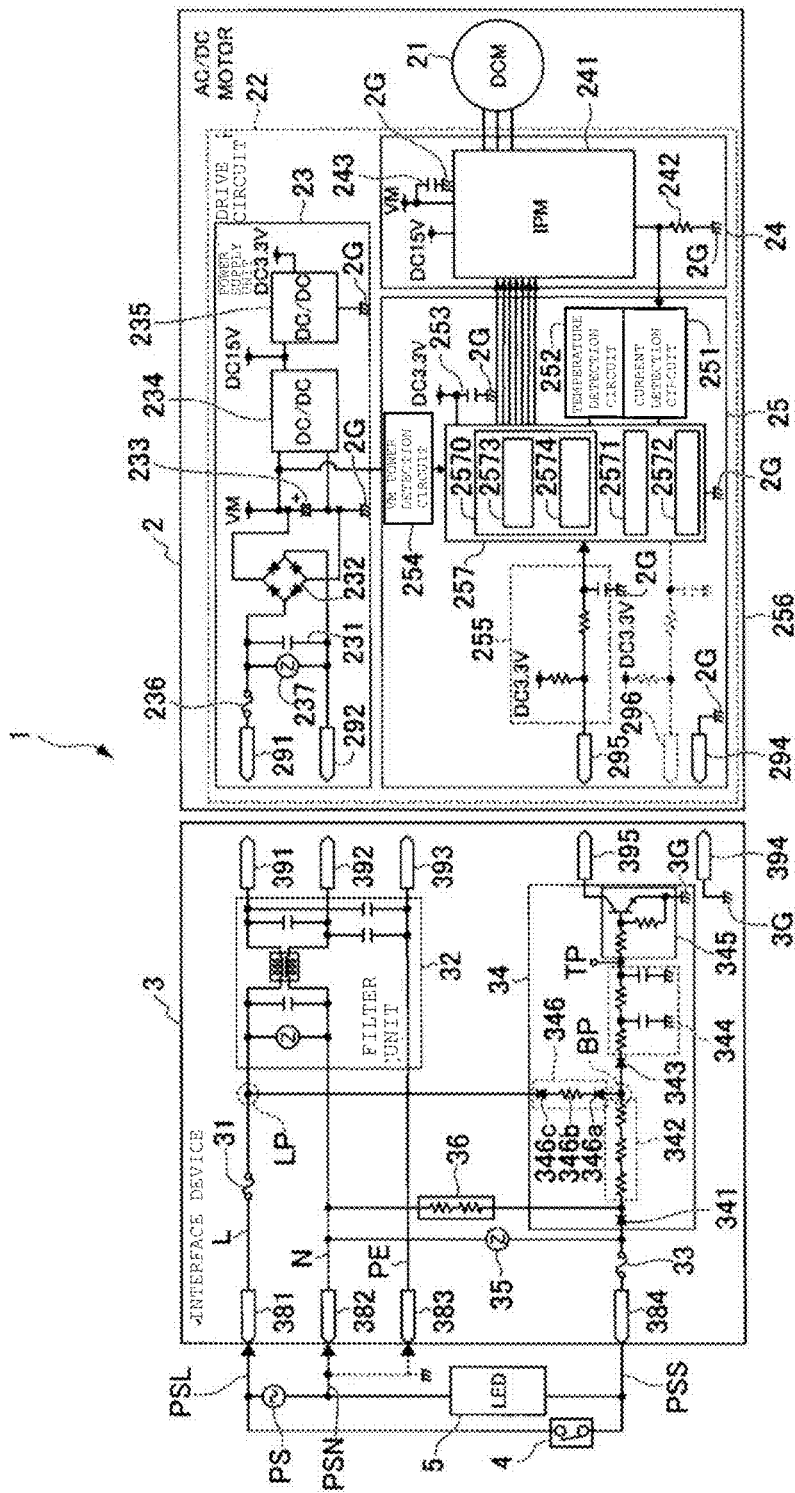
FIG. 1 is a diagram showing an example of a configuration of a motor drive system according to an example embodiment of the present disclosure.

FIG. 1 is a diagram illustrating an example of a configuration of a motor drive system 1 according to the first example embodiment.

The motor drive system 1 includes an AC/DC motor 2 (the description in the figure is "AC/DC MOTOR"), an interface device 3, a switch 4, and a load device 5 (the description in the figure is "LED"). The interface device 3 is an example of a signal conversion device.

The symbol PS is a power supply that supplies AC power to the motor drive system 1. The power supply PS is an example of a signal source.

The load device 5 together with the motor drive system 1 includes a load that receives supply of AC power from the power supply PS. The load device 5 may be, for example, a lighting device including an LED module. As shown in the figure, the power supply PS, the switch 4, and the load device 5 are connected in series. When the switch 4 is in the ON state, a closed circuit is formed, and power from the power supply PS is supplied to the load device 5. Note that the load device 5 may relate to the motor drive system 1 without being included in the motor drive system 1.

Next, the AC/DC motor 2 will be described.

The AC/DC motor 2 includes, for example, a motor main body 21 (the description in the figure is "DCM"), a drive circuit 22, and terminals 291, 292, and 294 to 296.

The motor main body 21 is a DC motor that is connected to a drive circuit 22 described later and rotates by electric power supplied from the drive circuit 22.

The drive circuit 22 includes, for example, a power supply unit 23, an inverter unit 24, and a control circuit 25.

First, the power supply unit 23 will be described.

The power supply unit 23 includes, for example, a capacitor 231, a rectifier 232, a capacitor 233, DC power supplies 234 and 235 (the description in the figure is "DC/DC"), a fuse 236, and a surge voltage limiting element 237.

The power supply side terminal of the power supply unit 23 also serves as terminals 291 and 292 from which AC power is supplied to the AC/DC motor 2. The power supply side terminal of the rectifier 232, the capacitor 231, and the surge voltage limiting elements 237 are connected in parallel to the terminal 291 and the terminal 292 through a pair of power supply lines. The power supply side terminal of the DC power supply 234 is connected in parallel to the DC side terminal of the rectifier 232. The power supply side terminal of the DC power supply 235 is connected in parallel to the load side terminal of the DC power supply 234. The power supply line connected to the terminal 291 is provided with the fuse 236. The position where the fuse 236 is provided is closer to a terminal 291 than the connection points where, for example, the rectifier 232, the capacitor 231, and the surge voltage limiting element 237 are connected.

The negative electrode of the DC side terminal of the rectifier 232 is connected to a ground electrode 2G in the drive circuit 22. The ground electrode 2G becomes a reference potential of the DC power supplies 234 and 235. In the following description, the potential of the ground electrode 2G will be described as the reference potential of the drive circuit 22.

For example, the rectifier 232 includes four bridge-connected diodes and performs full-wave rectification of alternating current. The positive electrode of the DC side terminal of the rectifier 232 supplies driving power for the motor main body 21 and control power for a DC power supply 234 described later. The capacitor 233 is connected in parallel to the DC side terminal of the rectifier 232. The capacitor 233 smooths the pulsating current output from the rectifier 232, and its DC voltage is referred to as a voltage VM. The DC power supply 234 and the DC power supply 235 are regulators that generate different DC voltages by constant voltage control. The DC power supply 234 and the DC power supply 235, for example, generate a first DC voltage (for example, DC 15 V) and a second DC voltage (for example, DC 3.3 V), and supply them to the drive circuit 22.

Next, the inverter unit 24 will be described.

The inverter unit 24 includes, for example, an inverter main body 241 (the description in the figure is "IPM"), a shunt resistor 242, and a bypass capacitor 243. The inverter main body 241 includes at least one switching element (not shown). The inverter main body 241 is connected to a coil included in the motor main body 21. The inverter main body 241 drives the motor main body 21 using the DC power (voltage VM, DC 15 V) supplied from the power supply unit 23. The inverter main body 241 rotates the motor main body 21 according to the signal supplied from the controller 257. The shunt resistor 242 is connected to the inverter main body 241 and the ground electrode 2G, and detects a drive current of the motor main body 21. The bypass capacitor 243 is connected to the power terminal of the voltage VM and the ground electrode 2G.

Next, the control circuit 25 will be described.

The control circuit 25 includes, for example, a current detection circuit 251, a temperature detection circuit 252, a bypass capacitor 253, a VM power detection circuit 254, a pull-up circuit 255, and a controller 257.

Terminals 294 to 296 are assigned to the control circuit as terminals connected to an external circuit of the drive circuit 22. The terminal 294 is connected to ground electrode 2G inside the drive circuit 22. The terminals 295 and 296 are input terminals for the control signal of the drive circuit 22. The terminals 295 and 296 are connected to signal lines for control signals. Note that the terminal 296 may be omitted, and the following description focuses on the control signal input to the terminal 295.

The current detection circuit 251 is connected to the non-ground side of the shunt resistor 242 of the inverter unit 24, and detects a voltage generated in the shunt resistor 242. This voltage indicates the current flowing through the shunt resistor 242. Temperature detection circuit 252 includes a temperature sensor for detecting a temperature abnormality or the like. The bypass capacitor 253 is connected to the power terminal having a potential of DC 3.3 V and the ground electrode 2G. The VM power detection circuit 254 is connected to the positive electrode of the power supply side terminal of the DC power supply 234 of the power supply unit 23, and detects the power supply voltage of the voltage VM. Outputs of the current detection circuit 251, the temperature detection circuit 252, and the VM power detection circuit 254 are connected to the controller 257.

The pull-up circuit 255 includes a signal line connected to the terminal 295 and the controller 257, a pull-up resistor that pulls up the signal line to DC 3.3 V, and an RC filter circuit. The RC filter circuit is, for example, a primary filter in which a capacitor connected to the signal line and the ground electrode 2G is combined with a resistor provided on the signal line. The configuration of the filter circuit is not limited to the illustrated configuration, and can be changed as appropriate, including removing.

The controller 257 includes, for example, a central processing unit (CPU) 2570, a storage unit 2571 such as a semiconductor memory, and a signal input/output circuit 2572. The controller 257 may be a field programmable gate array (FPGA) including a processor, or may be hardware.

The controller 257 includes, for example, a signal acquisition unit 2573 and an inverter control unit 2574. The signal acquisition unit 2573 acquires respective detection results by the current detection circuit 251, the temperature detection circuit 252, and the VM power detection circuit 254 via the signal input/output circuit 2572. The signal acquisition unit 2573 acquires the logical state of the control signal supplied from the interface device 3 via the signal input/output circuit 2572. The inverter control unit 2574 controls the inverter unit 24 based on the detection result by the current detection circuit 251, the temperature detection circuit 252, and the VM power detection circuit 254. For example, when the control signal from the interface device 3 is at the H (high) level, the inverter control unit 2574 outputs a control signal for energizing the motor main body 21 from the signal input/output circuit 2572 to the inverter unit 24, and drives the motor main body 21. When the control signal from the interface device 3 is at the L (low) level, the inverter control unit 2574 outputs a control signal for interrupting energization of the motor main body 21 from the signal input/output circuit 2572 to the inverter unit 24, and stops the rotation of the motor main body 21. As described above, the controller 257 may determine whether to energize or shut off the motor main body 21 according to the logic of the control signal from the interface device 3. The controller 257 may use the control signal not only for stopping driving the motor main body 21 according to the logic of the control signal from the interface device 3, but also for changing the internal setting parameter of the controller 257 in order to change parameters of the speed, torque, etc., when driving the motor main body 21.

Next, the interface device 3 will be described.

The interface device 3 includes, for example, a fuse 31, a filter unit 32, a fuse 33, a signal detection circuit 34 (detector), a surge voltage limiting element 35, and a resistor 36.

The interface device 3 includes, for example, terminals 381 to 384 as power supply PS-side terminals, and terminals 391 to 395 as AC/DC motor 2 side terminals.

First, connection on the power supply PS side of the interface device 3 will be described.

The terminals 381 to 383 are a power terminal and a ground terminal provided to be exposed outside the interface device 3. The terminal 384 is a control signal terminal. Note that in the case of the illustrated circuit, the terminal 381 also serves as a control signal terminal.

For example, the terminal 381 is connected to the first pole of the power supply PS via the wiring PSL outside the interface device 3. The terminal 382 is connected to the second pole of the power supply PS via the wiring PSN. The second pole of the power supply PS may be grounded. The terminal 383 is used as a security ground terminal. For example, the upper pole of the power supply PS shown in FIG. 1 is the first pole, and the lower pole is the second pole.

Terminal 384 is connected to the first pole of the power supply PS via the control signal line PSS. The switch 4 is provided on the control signal line PSS. One end of the load device 5 is connected to the control signal line PSS connecting one end of the terminal 384 and one end of the switch 4, and the other end of the load device 5 is connected to the second pole of the power supply PS. According to the above connection, power supply control of the load device 5, and switchover control for the operating state of the AC/DC motor 2 can be linked by operating the switch 4.

Next, the internal configuration of the interface device 3 will be described.

One end of a power supply line L, one end of a power supply line N, and one end of a ground line PE are respectively connected to the terminals 381 to 383. The other end of the power supply line L, the other end of the power supply line N, and the other end of the ground line PE are respectively connected to the terminals 391 to 393. The filter unit 32 is provided on the power supply line L and the power supply line N. The fuse 31 is provided closer to the terminal 381 than the filter unit 32 of the power supply line L. In the power supply line L, a connection point connecting the filter unit 32 and the fuse 31 is referred to as a connection point LP.

The filter unit 32 includes, for example, a coil and a plurality of capacitors for reducing common mode noise and normal mode noise, and a protection element for limiting a surge voltage. Some of the capacitors are connected to the ground line PE. Note that the internal configuration of the filter unit 32 is an example, and is not limited thereto, and may be changed to another configuration. Alternatively, the filter unit 32 may not be provided inside the interface device 3 and may be provided outside the interface device 3.

The terminal 384 is connected to an input terminal of the signal detection circuit 34 via a control signal line provided with the fuse 33. One end of a surge voltage limiting element 35 is connected to a control signal line between the fuse 33 and an input terminal of the signal detection circuit 34. The other end of surge voltage limiting element 35 is connected to the terminal 382.

The terminal 394 is connected to a ground electrode 3G inside the interface device 3.

The terminal 395 is an output terminal of the control signal output from the signal detection circuit 34.

Next, the signal detection circuit 34 will be described.

The signal detection circuit 34 includes, for example, a diode 341, a resistor 342, a diode 343, an LP filter 344, the comparison circuit 345, and a bias circuit 346.

The anode of the diode 341 is connected to the input terminals of the signal detection circuit 34, one end of the resistor 342 and one end of the resistor 36 are connected to the cathode of the diode 341, the anode of the diode 343 is connected to the other end of the resistor 342, the input terminal of the LP filter 344 is connected to the cathode of the diode 341, the input terminal of the comparison circuit 345 is connected to the output terminal of the LP filter 344, and the terminal 395 is connected to the output terminal of the comparison circuit 345. The other end of the resistor 36 is connected to the power supply line N.

Among the above connection points, the connection point where the other end of the resistor 342 and the anode of the diode 343 are connected is referred to as a connection point BP, and the input terminal of the comparison circuit 345 is referred to as a test terminal TP.

The LP filter 344 is a low-pass filter combining a resistor and a capacitor. The LP filter 344 is an example of a smoothing circuit that smooths a half-wave signal generated by the diode 343. The LP filter 344 may reduce the pulsation caused by the half-wave signal so that the comparison circuit 345 at the subsequent stage does not erroneously detect the signal. For example, a cascade-connected circuit in which two sets of combinations of a resistor and a capacitor are provided is exemplified. As a frequency characteristic of the LP filter 344, a cutoff frequency of the low-pass characteristic is determined so that the cutoff frequency is lower than the fundamental frequency of the alternating current. Note that the configuration of the LP filter 344 may be appropriately changed without being limited to this. For example, an averaging circuit, a peak hold circuit, or the like may be used.

The comparison circuit 345 includes at least one switching element. The comparison circuit 345 shown in the figure includes a grounded-emitter comparison circuit including, for example, one transistor, a first resistor and a second resistor for defining a base potential of the transistor.

For example, a connection point of the first resistor and the second resistor is connected to the base of the transistor of the comparison circuit 345. The other end of the first resistor is connected to the input terminal of the comparison circuit 345. The other end of the second resistor is connected to the ground electrode 3G. The emitter of the transistor is grounded to the ground electrode 3G, and the collector is connected to the output terminal of the comparison circuit 345, that is, the terminal 385. In the configuration in the signal detection circuit 34, the transistor has an open collector output. The configuration of the comparison circuit 345 is not limited to the configuration shown in the figure, but other types of switching elements may be used, or a so-called comparator may be used.

The bias circuit 346 includes a first diode 346a, a resistor 346b, and a second diode 346c connected in series. For example, the anode of the first diode 346a is connected to connection point BP, one end of the resistor 346b is connected to cathode of the first diode 346a, the anode of the second diode 346c is connected to the other end of the resistor 346b, and the cathode of the second diode 346c is connected to the connection point LP.

The above-described interface device 3 is used while being connected to the AC/DC motor 2. At this time, the terminals 291 to 295 are connected to the terminals 391 to 395 except the terminal 393, respectively. By not connecting the terminal 393 to the AC/DC motor 2, the ground electrode 2G of the AC/DC motor 2 and the ground electrode 3G of the interface device 3 are capacitively coupled to the ground electrode on the power supply PS side by a capacitor in the filter unit 32.

When the interface device 3 is connected to the AC/DC motor 2, the output terminal (terminal 395) of the comparison circuit 345 is pulled up to DC 3.3 V by the pull-up circuit 255 of the control circuit 25. Further, the potential of the terminal 394 is equal to the potential of the terminal 294.

For example, when a voltage exceeding a predetermined positive voltage (referred to as a threshold voltage VTH) is applied to the terminal 384, the transistor of the comparison circuit 345 detects this, and is in the ON state. This state is simply referred to as "the comparison circuit 345 outputs the ON signal". Conversely, when a voltage equal to or lower than the threshold voltage VTH is applied to the terminal 384, or when the terminal 384 is opened, the transistor of the comparison circuit 345 is in the OFF state. This state is simply referred to as "the comparison circuit 345 outputs the OFF signal".

The controller 257 functions by power supply from the power supply unit 23 in a state where desired AC power is supplied from the power supply PS. The controller 257 determines whether the switch 4 is in the ON state or the OFF state based on the voltage of the control signal (ON signal or OFF signal) supplied from the interface device 3 to the terminal 385, and determines, according to the detection result, whether the motor main body 21 is to be energized and driven or is to be stopped without energized.

Hereinafter, the operation relating to the signal detection circuit 34 of the motor drive system 1 will be described by exemplifying some typical use modes. For the sake of convenience, the description will be divided according to the combination of the state of the switch 4 (ON state/OFF state) and the AC phase (first phase/second phase). It is assumed that the switch 4 is in the ON state when the motor main body 21 is energized, and the switch 4 is in the OFF state when the motor main body 21 is not energized.

The phase in which the alternating current flows in the first direction is referred to as "first phase", and the phase in which the alternating current flows in the opposite direction is referred to as "second phase". For example, in the case of the first phase, the potential of the pole on the power supply line PSL side is higher than the potential of the pole on the power supply line PSN side, and in the second phase, the opposite is true.

The usage pattern A is an example of a configuration in which the load device 5 is not provided. This corresponds to the case where the load device 5 of FIG. 1 is removed.

(State A1: The Switch 4 is in the OFF State and AC is in the First Phase)

Since the load device 5 is not provided, when switch 4 is in the OFF state, there is no current flowing into terminal 384, and the signal detection circuit 34 outputs the OFF signal.

(State A2: The Switch 4 is in the OFF State and AC is in the Second Phase)

As in the state A1, the signal detection circuit 34 outputs the OFF signal.

(State A3: The Switch 4 is in the ON State and AC is in the First Phase)

Figure 2:
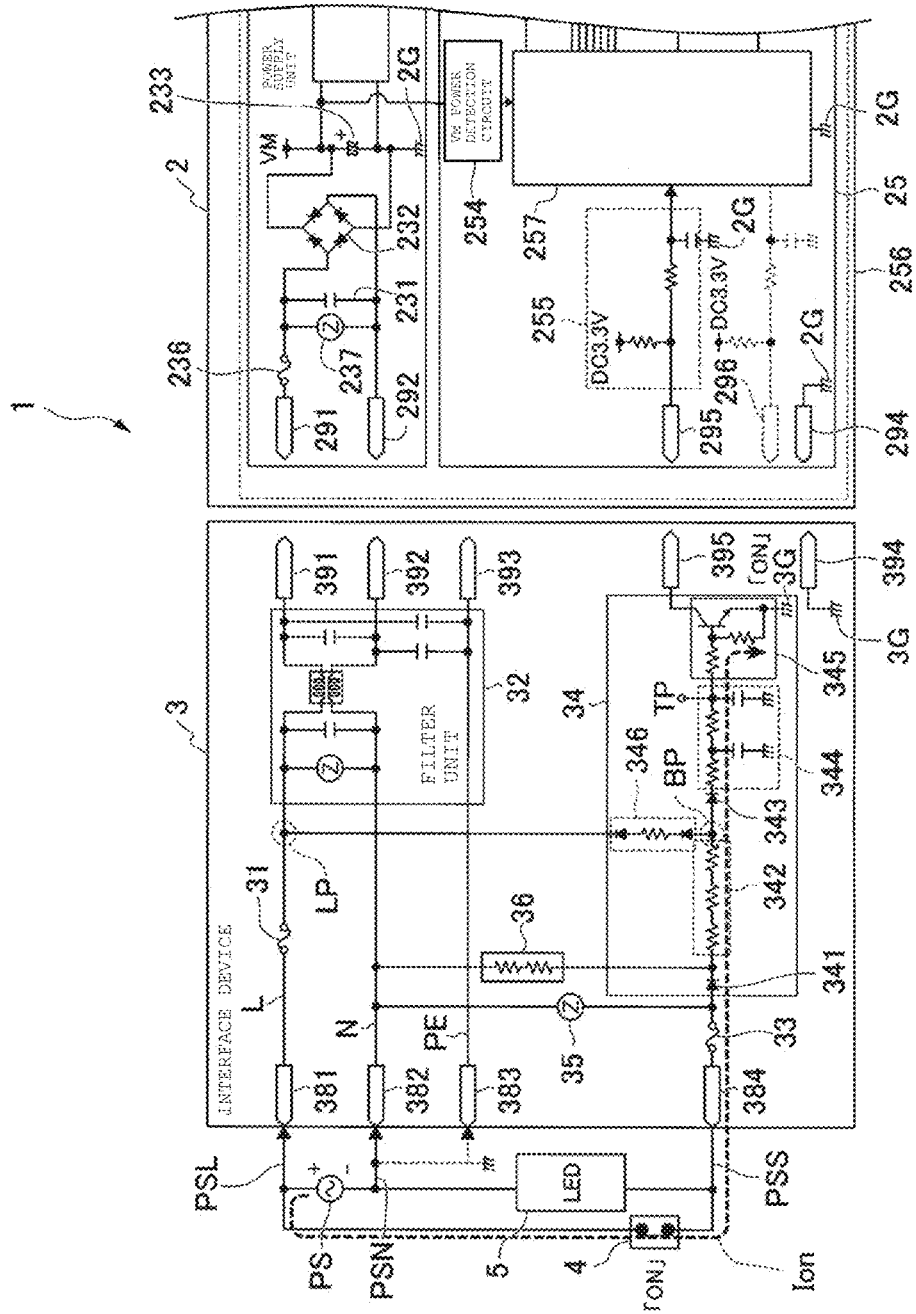
FIG. 2 is a diagram for explaining an operation of a signal detection circuit according to an example embodiment of the present disclosure in a state A3.

The operation of the signal detection circuit 34 in the state A3 will be described with reference to FIG. 2. FIG. 2 is a diagram for explaining the operation of the signal detection circuit 34 in the state A3 of the example embodiment.

The switch 4 is in the ON state, a voltage exceeding the threshold voltage VTH is supplied to the terminal 384, and a current Ion passing through the terminal 384 via the switch 4. The signal detection circuit 34 detects this current and outputs the ON signal.

Note that a period in which a voltage exceeding the threshold voltage VTH is not supplied to the terminal 384 may occur. During this period, since the current Ion does not flow through the terminal 384, the signal detection circuit 34 detects this state and outputs the OFF signal.

(State A4: The Switch 4 is in the ON State and AC is in the Second Phase)

Since the switch 4 is in the ON state, the potential of the signal supplied to the terminal 384 becomes negative. In this case, no current flows to the terminal 384 because the diode 341 is reverse-biased. Since no current flows into the signal detection circuit 34, the signal detection circuit 34 outputs the OFF signal.

Figure 3:
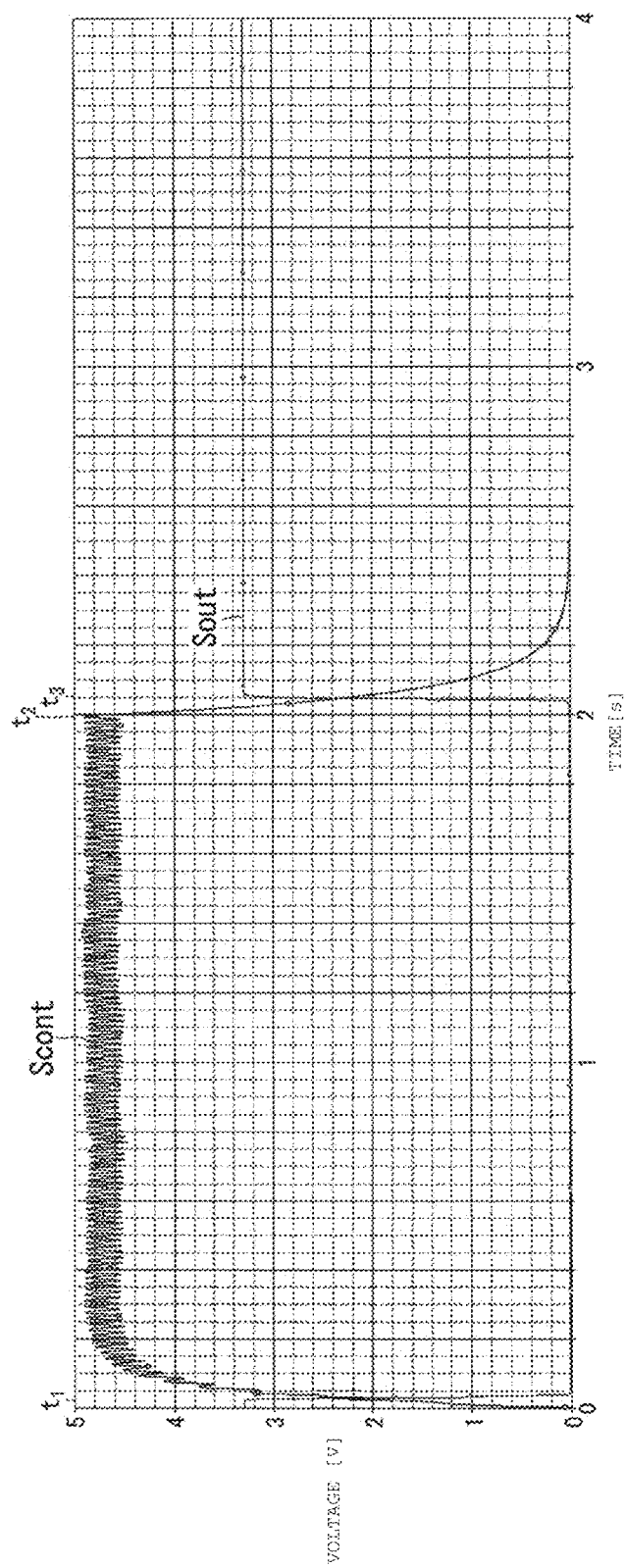
FIG. 3 is a diagram for explaining a simulation result of a signal detection circuit according to an example embodiment of the present disclosure.

With reference to FIG. 3, operations in the above (state A3) and (state A4) will be described.

FIG. 3 is a diagram for explaining a simulation result of the signal detection circuit 34 of the example embodiment. The waveform diagram shown in FIG. 3 relates to the above (state A3) and (state A4). The signal Scont in the waveform diagram indicates the voltage of the test terminal TP, and the signal Sout indicates the voltage of the terminal 395. In the initial state, the switch is in the OFF state, and the signal Sout has a potential indicating the H (high) level. At this time, the transistor of the comparison circuit 345 is in the OFF state.

When the switch 4 switches from the OFF state to the ON state at time 0, the voltage indicated by the signal Scont increases accordingly. The presence of the impedance and the presence of the LP filter 344 in the path of the current Ion cause a delay due to an excessive response to a change in the voltage of the signal Scont. The delay time from time 0 to time t1 depends on the capacitance of the capacitor of the LP filter 344, and a circuit provided in series between the power supply PS and the capacitor of the LP filter 344.

Since a voltage exceeding the threshold voltage VTH is supplied to the terminal 384, at time t1, the comparison circuit 345 detects the voltage, inverts the logic of the output signal, and outputs to the terminal 395 the signal Sout with a potential indicating the L (low) level.

When the switch 4 switches from the ON state to the OFF state at time t2, the voltage indicated by the signal Scont drops. Although the current Ion is shut off, the capacitor of LP filter 344 is charged, so that the voltage (terminal voltage of the capacitor) indicated by the signal Scont gradually decreases. This rate of change depends on the capacitance of the capacitor of the LP filter 344 and a circuit provided in parallel with the capacitor. When the voltage of the signal Scont decreases to a predetermined voltage, the comparison circuit 345 detects the voltage, inverts the logic of the output signal, and sets the signal Sout to the H level.

The above is the description of the usage state A.

(Usage state B) is an example of a configuration in which the load device 5 is provided. This is different from the above (Usage form A). The conditions from (state B1) to (state B4) are the same as the conditions from (state A1) to (state A4) except that the load device 5 is provided. The following description focuses on differences from (Usage form A).

(State B1: The Switch 4 is in the OFF State and AC is in the First Phase)

The switch 4 in the OFF state cuts off the current. Since the interface device 3 in this (state B1) does not have a path through which a current (referred to as "leakage current IL") passes via the load device 5, and is not affected the current. Therefore, the signal detection circuit 34 outputs the OFF signal.

(State B2: The Switch 4 is in the OFF State and AC is in the Second Phase)

The switch 4 in the OFF state cuts off the current, the leakage current IL may flow to the interface device 3 (the signal detection circuit 34) via the load device 5.

Figure 4:
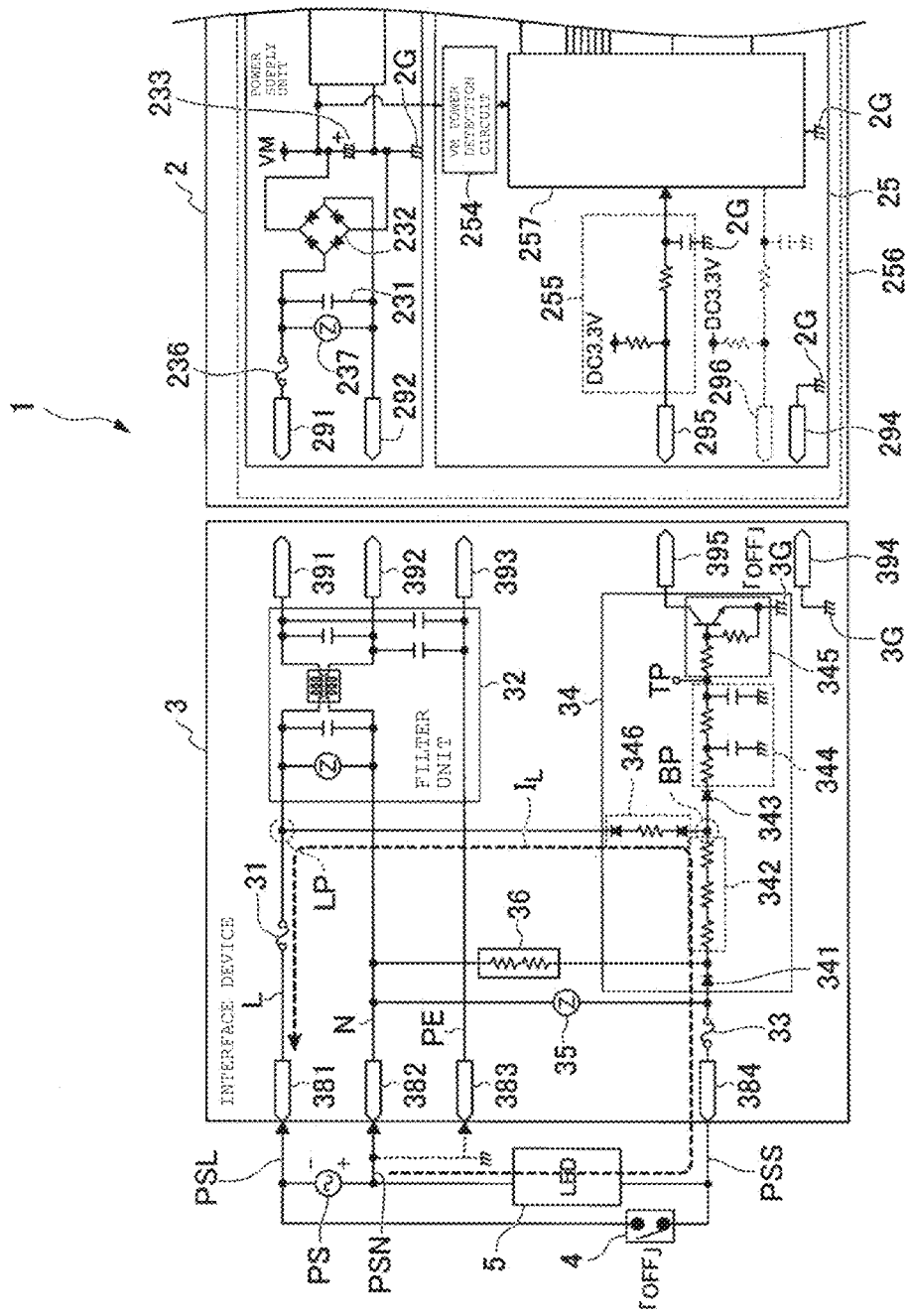
FIG. 4 is a diagram for explaining a state where there is a leakage current passing through a load device according to an example embodiment of the present disclosure.

With reference to FIG. 4, an operation when a leakage current flows into the signal detection circuit 34 will be described. FIG. 4 is a diagram for explaining a state where there is a leakage current passing through the load device 5 of the example embodiment. The leakage current IL flows in a path along the arrow.

The signal detection circuit 34 in this (state B1) outputs the OFF signal without being affected by the leakage current IL by satisfying a requirement described later.

(State B3: The Switch 4 is in the ON State and AC is in the First Phase)

The signal detection circuit 34 in this (state B3) outputs the ON signal regardless of the presence or absence of the load device 5. Reference is made to the description of (state A3) above.

(State B4: The Switch 4 is in the ON State and AC is in the Second Phase)

Since the switch 4 is in the ON state and the diode 341 is reverse-biased, no current flows to the terminal 384 as in the case of the above (state A4). The signal detection circuit 34 outputs the OFF signal.

Figure 5:
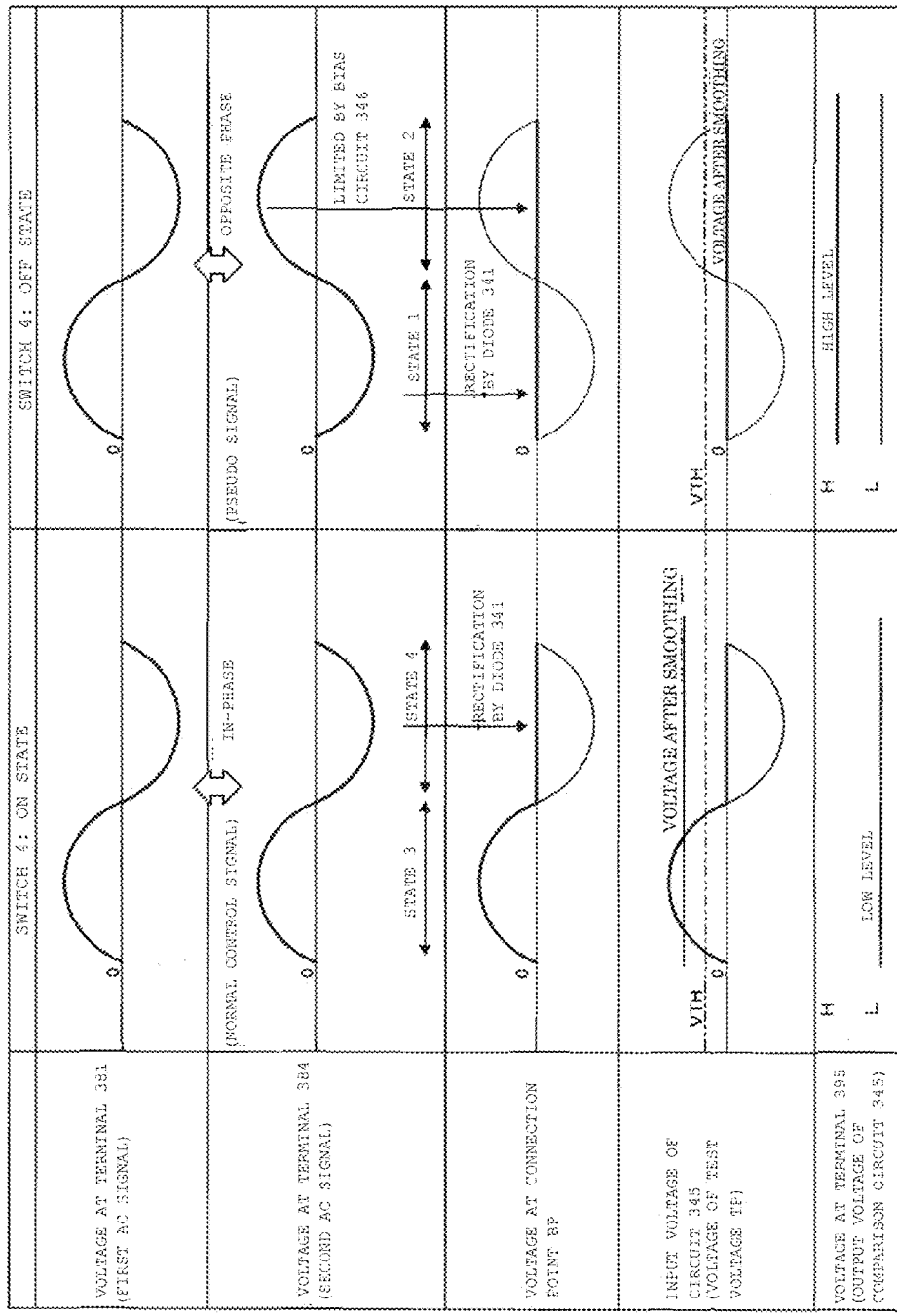
FIG. 5 is a diagram for explaining an operation of the signal detection circuit according to an example embodiment of the present disclosure.

FIG. 5 summarizes the operation of the signal detection circuit 34. FIG. 5 is a diagram for explaining the operation of the signal detection circuit 34 of the example embodiment. FIG. 5 shows a relationship between an AC signal (one cycle) input to the signal detection circuit 34 and a signal output from the signal detection circuit 34. The waveform of the AC (first AC signal) input to terminal 381, and the waveform of the AC (second AC signal) input to the terminal 384 are indicated in comparison of when the switch 4 is in the ON state with when the switch 4 is in the OFF state.

The signal detection circuit 34 in the above usage mode B detects a normal control signal without erroneously detecting a pseudo signal due to the leakage current IL.

Comparing the above pseudo signal with the normal control signal, the two signals are common in that the signal source is the AC power supply PS, but the phases of the respective signals are opposite because the AC poles that are the signal sources are different from each other. That is, when the normal control signal and the pseudo signal are half-wave rectified using a common half-wave rectifier circuit (diode 341), the phases of the half waves remaining without limited are different from each other.

Therefore, as shown in "voltage at connection point BP" in FIG. 5, the signal detection circuit 34 limits the amplitude of the signal input to the signal detection circuit 34 by using the negative voltage of the first AC signal so that the half wave generated from the normal control signal is left, and the half-wave generated from the pseudo signal is not left. In the signal after the limitation, the positive voltage of the pseudo signal is limited. Thus, the signal detection circuit 34 detects the positive voltage of the normal control signal without being affected by the pseudo signal, and outputs the result from the terminal 395.

More specifically, the bias circuit 346 of the signal detection circuit 34 allows the leakage current IL to flow through the power supply line L with the phase where the pseudo signal current (leakage current IL) flows into the terminal 384 of the signal detection circuit 34, and returns it to the power supply PS. This limits the potential of the test terminal TP so that it does not rise above the comparison potential (threshold voltage VTH) even when the leakage current IL flows.

Next, in the above (state B2), a requirement for outputting the OFF signal without the signal detection circuit 34 erroneously detecting the pseudo signal under the influence of the leakage current IL will be described. For example, the signal detection circuit 34 may be formed so as to satisfy the following requirement.

The signal detection circuit 34 causes the leakage current IL flowing into the terminal 384 to flow to the power supply line L through the bias circuit 346 (see FIG. 4). The diodes 346a and 346c provided in the bias circuit 346 are arranged in a forward direction in a direction in which the leakage current IL flows. The constants of respective components may be determined so that respective diodes provided on the path through which the leakage current IL flows are continuously in the conductive state while the leakage current IL flows. The period during which the leakage current IL flows is a period of about half a cycle of AC.

For example, the resistor 36 is a resistor for impedance matching with the impedance of the load device 5, and adjusts the partial pressure between the impedance of the load device 5 and the resistor 342. The resistor 36 is an example of a circuit for continuously making the respective diodes in a conductive state during a period in which the leakage current IL flows. The resistor 36 causes a dark current to flow for continuously making the diodes 346a and 346c in a conductive state during a period in which the leakage current IL flows. Since the resistor 36 causes the dark current to flow, the potentials of the connection point BP and the test terminal TP are stabilized. Also, by providing the resistor 36, the above dark current can flow without being affected by the fluctuation even when the leakage current IL fluctuates due to the operation of the load device 5. In the following description, the description of the dark current may be omitted.

The comparison circuit 345 of the signal detection circuit 34 detects the positive amplitude of the smoothed half-wave signal in order to detect the phase of the signal supplied to the terminal 384. In other words, by detecting the positive amplitude of the smoothed half-wave signal, the comparison circuit 345 determines whether the signal supplied to the terminal 384 (the second AC signal) is an in-phase signal or an opposite-phase signal with respect to the signal supplied to the terminal 381. Such a comparison circuit 345 is less susceptible to surge voltage due to diode switching. Further, the signal detection circuit 34 does not simply detect the presence or absence of the second AC signal, but detects the phase of the second AC signal using the amplitude of the smoothed signal.

Therefore, the diode 341, the resistor 342, and the bias circuit 346 may be configured so that the potential of the connection point BP is maintained at a lower potential than the comparison potential of the comparison circuit 345 even when the leakage current IL flows. The potential of the connection point BP is a voltage obtained by voltage-dividing the voltage twice as high as the peak voltage of the alternating current by a set of the diode 341 and the resistor 342 and the bias circuit 346, and the constants of respective components may be determined so as to satisfy the above conditions. The comparison potential of the comparison circuit 345 is different from the threshold voltage VTH for identifying the potential of the connection point BP, but may be regarded as substantially the same.

The signal detection circuit 34 formed to satisfy the above requirements can output the OFF signal even in a situation where the leakage current IL flows into the terminal 384.

Note that the signal detection circuit 34 of the present example embodiment uses the leakage current IL for the above operation, but does not detect the presence or absence of the inflowing leakage current IL. As shown in FIG. 4, the leakage current IL flows from the load device 5, but is not supplied through the switch 4. The state of the load device 5 is not a state where power is supplied through the switch 4 and the load device 5 is driven. Therefore, the leakage current IL is not part of the current flowing to drive the load device 5.

According to the above example embodiment, the terminal 381 (first signal input terminal) of the interface device 3 is supplied with the first AC signal from the power supply PS (signal source). The terminal 384 (second signal input terminal) is supplied with the second AC signal from the power supply PS. The second AC signal includes an in-phase signal that is in phase with the first AC signal and an opposite-phase signal that is opposite in phase with the first AC signal. The second AC signal supplied to the terminal 384 is a signal in which the above-mentioned in-phase signal and the opposite-phase signal are switched by the switch 4, and the phase is switched according to the state of the switch 4. The signal detection circuit 34 uses the first AC signal supplied to the terminal 381 to detect whether the second AC signal supplied to the terminal 384 is an in-phase signal or an opposite-phase signal of the first AC signal. As a result, the interface device 3 can switch the operating state of the AC/DC motor 2 (control target) by a simpler method using the supplied signal. Note that the LP filter 344 and the comparison circuit 345 of the example embodiment are examples of a detector.

For example, in the interface device 3, the diode 341 (first rectifier circuit) generates a half-wave signal obtained by half-wave rectifying the second AC signal supplied to the terminal 384. The bias circuit 346 negatively biases the half-wave signal generated by diode 341 during the period when the first AC signal supplied to terminal 381 has a negative amplitude. The diode 343 (second rectifier circuit) generates a second half-wave signal obtained by half-wave rectifying the second AC signal negatively biased by the bias circuit 346. For example, the comparison circuit 345 may detect whether the second AC signal supplied to the terminal 384 is an in-phase signal or an opposite-phase signal of the first AC signal by detecting a positive amplitude of the second half-wave signal generated by the diode 343. As a result, the interface device 3 can detect, by a simple method, whether the second AC signal supplied to the terminal 384 is a pseudo signal due to the leakage current IL or a normal control signal.

The motor drive system 1 according to the second example embodiment will be described with reference to FIG. 6.

Figure 6:
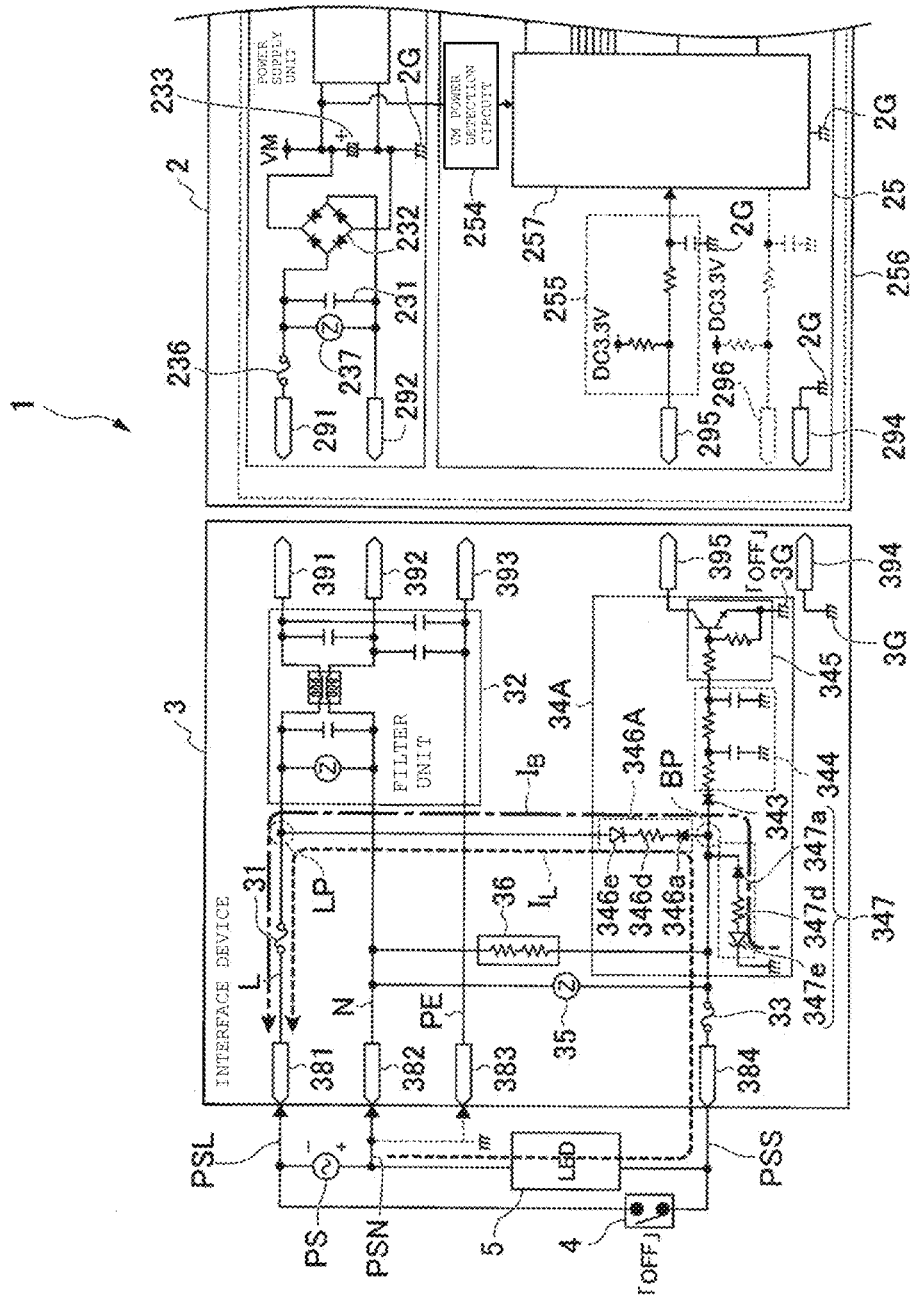
FIG. 6 is a diagram showing an example of a configuration of a motor drive system according to a second example embodiment of the present disclosure.

FIG. 6 is a configuration diagram of the motor drive system 1 according to the second example embodiment. The following description focuses on the differences from the first example embodiment.

The interface device 3 of the motor drive system 1 includes a signal detection circuit 34A instead of the signal detection circuit 34.

In the signal detection circuit 34A, the diode 341 and the resistor 342 are removed from the signal detection circuit 34, a first bias circuit 346A instead of the bias circuit 346 is provided, and a second bias circuit 347 is added.

The first bias circuit 346A includes the first diode 346a, a resistor 346d, and a first constant voltage diode 346e connected in series. For example, the anode of the first diode 346a is connected to a connection point BP, one end of the resistor 346d is connected to the cathode of the first diode 346a, the cathode of the first constant voltage diode 346e is connected to the other end of the resistor 346d, and the anode of the first constant voltage diode 346e is connected to the connection point LP.

The second bias circuit 347 includes a third diode 347a, a resistor 347d, and a second constant voltage diode 347e connected in series. For example, the cathode of the third diode 347a is connected to connection point BP, one end of the resistor 347d is connected to the anode of the third diode 347a, the anode of the second constant voltage diode 347e is connected to the other end of the resistor 347d, and the cathode of the second constant voltage diode 347e is connected to the ground electrode 3G.

In the case of the signal detection circuit 34A, by omitting some circuit elements from the signal detection circuit 34, only the fuse 33 (circuit protection element) is left between terminal 384 and connection point Bp. Thus, the potential of the connection point Bp is substantially equal to the potential of the terminal 384. Further, the connection destination of the one end of the resistor 36 in the signal detection circuit 34A is the connection point Bp. Note that the resistor 36 causes a dark current to continuously flow through a diode 346a and a first constant current diode 346e during a period in which the leakage current IL flows. The first example embodiment is referred for the description of the other resistors 36.

As described above, the signal detection circuit 34A is different from the signal detection circuit 34 in the circuit for limiting the potential of the connection point Bp.

Next, an operation related to the signal detection circuit 34A of the motor drive system 1 will be described by dividing the operation into four states by a combination of an ON/OFF state of the switch 4 and an AC phase.

In the second example embodiment, the description corresponding to the above (usage mode A) is omitted, but the second example embodiment is also applicable to (usage mode A).

(Usage Mode B)
(State B1: The Switch 4 is in the OFF State and AC is in the First Phase)

As in the first example embodiment, the signal detection circuit 34A outputs the OFF signal.

(State B2: The Switch 4 is in the OFF State and AC is in the Second Phase)

Although the current through the switch 4 is cut off because the switch 4 is in the OFF state, the signal detection circuit 34A may be affected by the load device 5.

For example, when the load device 5 does not flow a leakage current, the signal detection circuit 34A is not affected by the load device 5. In this case, since the configuration is the same as the usage mode A, detailed description is omitted. On the other hand, some of the load devices 5 flow the leakage current IL depending on the configuration of the internal circuit.

Next, an operation when the leakage current IL flowing through the load device 5 flows into the signal detection circuit 34 will be described. The arrows shown in FIG. 6 indicate the leakage current IL and the bias current IB. Each current flows in a path along the arrow.

The bias current IB flows from the ground electrode 3G to the power supply line L through the second bias circuit 347 and the first bias circuit 346A. When the bias current IB is flowing, the potential at the connection point BP is limited to a voltage range exceeding a voltage higher than the potential of the power supply line L by at least the voltage of the first constant voltage diode 346e, and not exceeding a voltage lower than the potential of the ground electrode 3G by at least the voltage of the second constant voltage diode

347e. A diode and a resistor in addition to the above constant voltage diode are provided in the path where the bias current IB flows, so that further, the above voltage range becomes narrower. The voltage (operating point) at the connection point BP is determined by each constant of the circuit connected to the connection point BP and the magnitudes of the leakage current IL and the bias current IB.

Also in this (state B2), the signal detection circuit 34A is required to output the OFF signal without being affected by the leakage current IL. The signal detection circuit 34A may satisfy the following requirements.

The signal detection circuit 34A causes the leakage current IL flowing into the terminal 384 to flow to the power supply line L through the bias circuit 346A. The diodes 346*a* provided in the bias circuit 346A are arranged in a forward direction in a direction in which the leakage current IL flows. The constants of respective components may be determined so that respective diodes provided in the path through which the leakage current IL flows are in the conductive state by the leakage current IL and the bias current IB.

The constants of respective elements of the second bias circuit 347 and the first bias circuit 346A are determined so that the potential of the connection point BP is maintained at a potential lower than the comparison potential (threshold potential) of the comparison circuit 345 even when the leakage current IL flows.

As described above, the signal detection circuit 34A outputs the OFF signal.

(State B3: The Switch 4 is in the ON State and AC is in the First Phase)

The signal detection circuit 34 in this (state B3) outputs the OFF signal regardless of the presence or absence of the load device 5. Reference is made to the description of (state A3) of the first example embodiment described above.

(State B4: The Switch 4 is in the ON State and AC is in the Second Phase)

Since the switch 4 is in the ON state and the diode 343 is reverse-biased, no current flows from the terminal 384 to the comparison circuit 345. The signal detection circuit 34 outputs the OFF signal.

According to the above example embodiment, the bias circuit 346A and the bias circuit 347 negatively biases the second AC signal supplied to the terminal 384 during the period in which the first AC signal supplied to the terminal 381 has a negative amplitude. The diode 343 (rectifier circuit) generates a half-wave signal obtained by half-wave rectifying the second AC signal biased by the bias circuit 346 and the bias circuit 347. For example, the comparison circuit 345 may detect whether the second AC signal supplied to the terminal 384 is an in-phase signal or an opposite-phase signal of the first AC signal by detecting a positive amplitude of the half-wave signal generated by the diode 343. In this way, in a bias circuit 346A and the bias circuit 347 selectively negatively biases the second AC signal supplied to the terminal 384 during a period in which the first AC signal supplied to the terminal 381 has a negative amplitude. This facilitates the comparison circuit 345 to identify the second AC signal supplied to the terminal 384.

As described above, a signal conversion device of the present example embodiment includes a first signal input terminal to which a first AC signal is supplied from a signal source, a second signal input terminal including an in-phase signal that is in phase with the first AC signal and an opposite-phase signal that is opposite in phase with the first AC signal, the second signal input terminal to which a second AC signal whose phase has been switched by a switchover between the in-phase signal and the opposite-phase signal is supplied from the signal source, and a detector that detects, using the supplied first AC signal, whether the supplied second AC signal is the in-phase signal or the opposite-phase signal. Accordingly, the signal conversion device can switch the operating state of the control target by a simpler method using the supplied signal.

Further, the detector may include a first rectifier circuit that generates a half-wave signal obtained by half-wave rectifying the supplied second AC signal, a bias circuit that applies a negative bias to the generated half-wave signal during a period in which the supplied first AC signal has a negative amplitude, a second rectifier circuit that generates a second half-wave signal obtained by half-wave rectifying the biased second AC signal, and an amplitude detector that detects whether the supplied second AC signal is the in-phase signal or the opposite-phase signal by detecting a positive amplitude of the generated second half-wave signal. In this case, the first rectifier circuit half-wave rectifies the supplied second AC signal during the period when the supplied first AC signal has a negative amplitude, and further, applies a negative bias to the signal. The second rectifier circuit rectifies the half-wave rectified and negatively biased signal during the period in which the first AC signal has a negative amplitude, regardless of the amplitude of the first AC signal, so that it is possible to detect the positive amplitude of the second half-wave signal after the half-wave rectification, making it easy to detect whether the supplied second AC signal is the in-phase signal or the opposite-phase signal for the first AC signal.

Further, the detector may include a bias circuit that applies a negative bias to the supplied second AC signal during a period in which the supplied first AC signal has a negative amplitude, a rectifier circuit that generates a half-wave signal obtained by half-wave rectifying the biased second AC signal, and an amplitude detector that detects whether the supplied second AC signal is the in-phase signal or the opposite-phase signal by detecting a positive amplitude of the generated half-wave signal. In this case, the second rectifier circuit performs the half-wave rectification after biasing the supplied second AC signal negatively during the period when the supplied first AC signal has a negative amplitude, so that it becomes easy to detect the positive amplitude of the second half-wave signal after half-wave rectified.

Further, the amplitude detector may include a smoothing circuit that smooths the generated half-wave signal, and may detect whether the supplied second AC signal is the in-phase signal or the opposite-phase signal by detecting a positive amplitude of the smoothed half-wave signal. As a result, regardless of the phase of the generated half-wave signal, it is possible to detect the amplitude of the smoothed half-wave signal, and it is possible to detect whether the supplied second AC signal is an in-phase signal or an opposite-phase signal without using a synchronous circuit to generate the synchronization signal based on the supplied first AC signal or the supplied second AC signal.

Also, the motor may include a motor main body, the above signal conversion device, and a drive circuit that controls the motor main body based on a detection result by the signal conversion device. With such a motor, the result of detection by the signal conversion device can be used for its control.

As described above, the example embodiments of the present disclosure have been described in detail with reference to the drawings. The specific configuration is not limited to the example embodiments, and may be changed, replaced, deleted, or the like without departing from the spirit of the disclosure.

For example, the drive circuit 22 may be changed as follows. The drive circuit 22 may receive a control signal from the interface device 3 by a relay, and control the drive state of the motor main body by controlling the opening and closing of the contact of the relay.

In addition, the number of fuses, surge voltage limiting elements 35 and 237, etc., which function as a protection circuit, and the positions at which they are arranged are not limited thereto, and may be changed as appropriate.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A signal conversion device comprising:
    a first signal input terminal to which a first AC signal is supplied from a signal source;
    a second signal input terminal including an in-phase signal that is in phase with the first AC signal and an opposite-phase signal that is opposite in phase with the first AC signal, the second signal input terminal is supplied with a second AC signal whose phase has been switched by a switchover between the in-phase signal and the opposite-phase signal from the signal source; and
    a detector that detects, using the supplied first AC signal, whether the supplied second AC signal is the in-phase signal or the opposite-phase signal.

2. The signal conversion device according to claim 1, wherein the detector includes:
    a first rectifier circuit that generates a half-wave signal obtained by half-wave rectifying the supplied second AC signal;
    a bias circuit that applies a negative bias to the generated half-wave signal during a period in which the supplied first AC signal has a negative amplitude;
    a second rectifier circuit that generates a second half-wave signal obtained by half-wave rectifying the biased second AC signal; and
    an amplitude detector that detects whether the supplied second AC signal is the in-phase signal or the opposite-phase signal by detecting a positive amplitude of the generated second half-wave signal.

3. The signal conversion device according to claim 2, wherein the amplitude detector:
    includes a smoothing circuit that smooths the generated half-wave signal; and
    detects whether the supplied second AC signal is the in-phase signal or the opposite-phase signal by detecting a positive amplitude of the smoothed half-wave signal.

4. A motor drive system comprising:
    a motor main body;
    the signal conversion device according to claim 3; and
    a drive circuit that controls the motor main body based on a detection result by the signal conversion device.

5. A motor drive system comprising:
    a motor main body;
    the signal conversion device according to claim 2; and
    a drive circuit that controls the motor main body based on a detection result by the signal conversion device.

6. The signal conversion device according to claim 1, wherein the detector includes:
    a bias circuit that applies a negative bias to the supplied second AC signal during a period in which the supplied first AC signal has a negative amplitude;
    a rectifier circuit that generates a half-wave signal obtained by half-wave rectifying the biased second AC signal; and
    an amplitude detector that detects whether the supplied second AC signal is the in-phase signal or the opposite-phase signal by detecting a positive amplitude of the generated half-wave signal.

7. The signal conversion device according to claim 6, wherein the amplitude detector:
    includes a smoothing circuit that smooths the generated half-wave signal; and
    detects whether the supplied second AC signal is the in-phase signal or the opposite-phase signal by detecting a positive amplitude of the smoothed half-wave signal.

8. A motor drive system comprising:
    a motor main body;
    the signal conversion device according to claim 7; and
    a drive circuit that controls the motor main body based on a detection result by the signal conversion device.

9. A motor drive system comprising:
    a motor main body;
    the signal conversion device according to claim 6; and
    a drive circuit that controls the motor main body based on a detection result by the signal conversion device.

10. A motor drive system comprising:
    a motor main body;
    the signal conversion device according to claim 1; and
    a drive circuit that controls the motor main body based on a detection result of the signal conversion device.

* * * * *